US011836059B1

(12) United States Patent
Shirron et al.

(10) Patent No.: US 11,836,059 B1
(45) Date of Patent: Dec. 5, 2023

(54) SYSTEM AND METHOD FOR TESTING NON-VOLATILE MEMORY EXPRESS STORAGE DEVICES

(71) Applicant: SANBlaze Technology, Inc., Littleton, MA (US)

(72) Inventors: Stephen F. Shirron, Acton, MA (US); B. Vincent Asbridge, Worcester, MA (US)

(73) Assignee: SANBlaze Technology, Inc., Littleton, MA (US)

( * ) Notice: Subject to any disclaimer, the term of this patent is extended or adjusted under 35 U.S.C. 154(b) by 210 days.

(21) Appl. No.: 17/549,463

(22) Filed: Dec. 13, 2021

Related U.S. Application Data

(60) Provisional application No. 63/125,172, filed on Dec. 14, 2020.

(51) Int. Cl.
*G06F 11/22* (2006.01)
*G06F 13/16* (2006.01)
*G06F 13/42* (2006.01)

(52) U.S. Cl.
CPC ........ *G06F 11/221* (2013.01); *G06F 11/2268* (2013.01); *G06F 13/1668* (2013.01); *G06F 13/4221* (2013.01); *G06F 2213/0026* (2013.01)

(58) Field of Classification Search
CPC .............. G06F 11/221; G06F 11/2268; G06F 13/1668; G06F 13/4221
USPC .............................................. 714/43, 44, 45
See application file for complete search history.

(56) References Cited

U.S. PATENT DOCUMENTS

| | | | |
|---|---|---|---|
| 9,135,200 | B2 | 9/2015 | Shao |
| 9,262,270 | B2 | 2/2016 | Jayaprakash Bharadwaj et al. |
| 9,396,145 | B1 * | 7/2016 | Chu .................... G06F 11/3466 |
| 9,690,738 | B2 | 6/2017 | Shen |
| 9,785,530 | B2 | 10/2017 | Du |
| 10,565,043 | B2 | 2/2020 | Zhang et al. |
| 10,636,577 | B2 | 4/2020 | Bakshi et al. |
| 10,663,515 | B2 | 5/2020 | Narayanun et al. |
| 10,929,260 | B2 | 2/2021 | Hsu et al. |
| 10,948,540 | B2 | 3/2021 | Hobbs et al. |

(Continued)

FOREIGN PATENT DOCUMENTS

| | | |
|---|---|---|
| CN | 107122277 A | 9/2017 |
| CN | 108108277 A | 6/2018 |

(Continued)

*Primary Examiner* — Chae M Ko
(74) *Attorney, Agent, or Firm* — Clocktower Law LLC; Erik J. Heels; Michael A. Bartley

(57) ABSTRACT

PCIe devices may be connected to a test system for development, quality assurance, manufacturing, design validation, qualification, certification, and other testing. PCIe bus or other unexpected errors can avoid direct capture by the test system. Inserting a PCIe analyzer can capture a trace of PCIe bus data around any specific trigger. Due to the high volume and speed of data crossing the data bus when testing multiple devices, finding a correct trigger for an analyzer trace capture is akin to finding a needle in a haystack. By configuring a specific trigger pattern that the test system can send across the PCIe bus without impacting any of the devices under test, the test system can trigger the analyzer at the precise time needed to capture a PCIe bus data trace around the error.

9 Claims, 4 Drawing Sheets

(56) References Cited

U.S. PATENT DOCUMENTS

| | | | |
|---|---|---|---|
| 2007/0257782 A1* | 11/2007 | Etcheson | G08B 23/00 |
| | | | 340/521 |
| 2016/0321159 A1* | 11/2016 | Romm | G06F 11/3636 |
| 2017/0024266 A1* | 1/2017 | Iwai | G06F 11/3656 |
| 2020/0364129 A1 | 11/2020 | Das Sharma | |
| 2021/0073094 A1 | 3/2021 | Poppe et al. | |
| 2021/0089418 A1 | 3/2021 | Das Sharma | |
| 2021/0223314 A1 | 7/2021 | Carmichael et al. | |
| 2021/0342510 A1* | 11/2021 | Becht | G06F 30/3308 |

FOREIGN PATENT DOCUMENTS

| | | |
|---|---|---|
| CN | 106502944 B | 5/2019 |
| CN | 106201831 B | 8/2019 |
| WO | 201505498 A1 | 4/2015 |
| WO | 2015066842 A1 | 5/2015 |
| WO | 2016037503 A1 | 3/2016 |
| WO | 2016150098 A1 | 9/2016 |
| WO | 2021073048 A1 | 4/2021 |

\* cited by examiner

SYSTEM AND METHOD FOR TESTING NON-VOLATILE MEMORY EXPRESS STORAGE DEVICES

CROSS-REFERENCE TO RELATED APPLICATIONS

This utility patent application claims priority from U.S. provisional patent application Ser. No. 63/125,172, filed Dec. 14, 2020, titled "System and Method for Testing Non-Volatile Memory Express Storage Devices", and naming inventors Stephen F. Shirron and B. Vincent Asbridge.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2021, SANBlaze Technology, Inc.

BACKGROUND

Field of Technology

This relates to testing storage devices, and more particularly to rapid testing of multiple PCIe NVMe storage drives.

Background

Systems exist to test multiple PCIe (Peripheral Component Interconnect Express) connected NVMe (Non-Volatile Memory Express) storage devices, including validating specification compliance, data integrity, power and reset testing, MI compliance, and complex custom test suites. Test systems such as the SANBLaze SBExpress can perform transactional tracing, track low level error counters including Link Training and Status State Machine (LTSSM), and subject devices under test to variations in voltage and complex reset, link training, and data integrity testing, while logging the tested devices behavior.

With this testing, there are still bus errors which may occur that are not traceable by the testing system, such as a transaction to a device that never completes. Connecting a PCIe analyzer to the bus during the testing provides an ability to monitor all data on the PCIe bus during the test, and record a specific trace of the PCIe data upon a configured triggering event, but capturing a trace of that data at any specific point, without integration of the testing system and analyzer, becomes challenging due to the amount of data traveling over the PCIe bus. For example, an analyzer with a 64 GB buffer, and a typical PCIe sequential read rate of 4 GB/second, maintains 16 seconds worth of PCIe data.

If the test system detects an error caused by an unknown event, but the analyzer is not configured to capture a trace of that particular unknown event, the trace data which could identify the specific event is lost.

U.S. Pat. No. 10,929,260 ("TRAFFIC CAPTURE AND DEBUGGING TOOLS FOR IDENTIFYING ROOT CAUSES OF DEVICE FAILURE DURING AUTOMATED TESTING", issued Feb. 23, 2021 to Hsu et al.) discloses, in the Abstract, "A method for diagnosing a root cause of failure using automated test equipment is disclosed. The method comprises monitoring data traffic associated with testing a device under test (DUT) in the automated test equipment using a plurality capture modules, wherein the plurality of capture modules are programmed onto a programmable logic device, wherein the programmable logic device is controlled by a system controller and is operable to generate commands and data to test the DUT, wherein the plurality of capture modules are operable to selectively capture the data traffic to be monitored, and wherein the data traffic monitored comprises a flow of traffic between the DUT and the system controller. The method further comprises saving results associated with the monitoring in respective memories associated with each of the plurality of capture modules. Further, the method comprises transmitting the results upon request to an application program executing on the system controller."

U.S. Pat. No. 10,948,540 ("INTEGRATED PROTOCOL ANALYZER CONFIGURED WITHIN AUTOMATED TEST EQUIPMENT (ATE) HARDWARE", issued Mar. 16, 2021 to Hobbs et al.) discloses, in the Abstract, "A method for monitoring communications between a device under test (DUT) and an automated test equipment (ATE) is disclosed. The method comprises programming an interface core and a protocol analyzer module onto a programmable logic device, wherein the programmable logic device is controlled by a system controller and is operable to generate commands and data to test a DUT, wherein the interface core is operable to generate signals to communicate with the DUT using a protocol associated with the DUT. The method also comprises monitoring data and command traffic associated with the protocol in the interface core using the protocol analyzer module and storing results associated with the monitoring in a memory comprised within the protocol analyzer module. The method finally comprises transmitting the results upon request to an application program associated with the protocol analyzer module executing on the system controller."

U.S. Pat. No. 10,636,577 ("SAFE HANDLING OF LINK ERRORS IN A PERIPHERAL COMPONENT INTERCONNECT EXPRESS (PCIE) DEVICE", issued Apr. 28, 2020 to Bakshi et al.) discloses, in the Abstract, "Safe handling of link errors in a Peripheral Component Interconnect (PCI) express (PCIE) device is disclosed. In one aspect, safe handling of link errors involves detecting errors in a PCIE link and maintaining the PCIE link by preventing the reporting of detected errors and providing safe data to a host in communication with the PCIE link. A PCIE link can be established between a host (incorporating a root complex) and an endpoint device, through which the host can request the performance of operations (e.g., read data, write data) by the endpoint device. Circuitry and/or software can monitor the PCIE link and perform safe handling of link errors when they occur. The circuitry detects link errors and consumes them in such a manner that the host is unaware that an error has occurred and only safe (e.g., non-corrupted) data is provided to the host."

United States Patent Application Publication Number 2021/0223314 ("VECTOR EYES", published Jul. 22, 2021 to Carmichael et al.) discloses, in the Abstract, "Systems and methods are disclosed for testing a device under test (DUT) by receiving a test pattern for a functional test, wherein the test pattern includes a test vector, an expected test result, and an expected power consumption; instructing the test system to run a repetitive loop using a selected functional test as the stimulus; at selected steps in the functional test, measuring power consumption of the DUT; and validating the DUT based on validating the test vector and the power consumption with one or more expected test result patterns and expected power consumption patterns."

What is needed, therefore, is a system and method such that the test system can trigger a trace of the PCIe bus captured by a PCIe analyzer at any particular time.

BRIEF SUMMARY

PCIe devices may be connected to a test system for development, quality assurance, manufacturing, design validation, qualification, certification, and other testing. PCIe bus or other unexpected errors can avoid direct capture by the test system. Inserting a PCIe analyzer can capture a trace of PCIe bus data around any specific trigger. Due to the high volume and speed of data crossing the data bus when testing multiple devices, finding a correct trigger for an analyzer trace capture is akin to finding a needle in a haystack. By configuring a specific trigger pattern that the test system can send across the PCIe bus without impacting any of the devices under test, the test system can trigger the analyzer at the precise time needed to capture a PCIe bus data trace around the error.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Operation

Figure 1:
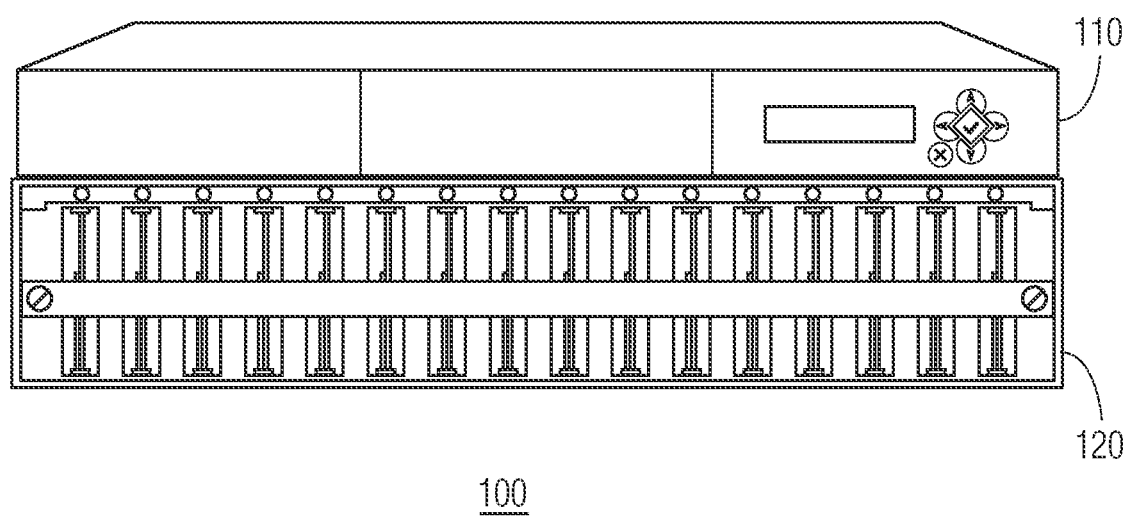
FIG. 1 is a photograph of a test system including a device for controlling test software and a connected rackmount chassis holding up to sixteen drives for testing (devices under test).
Figure 2:
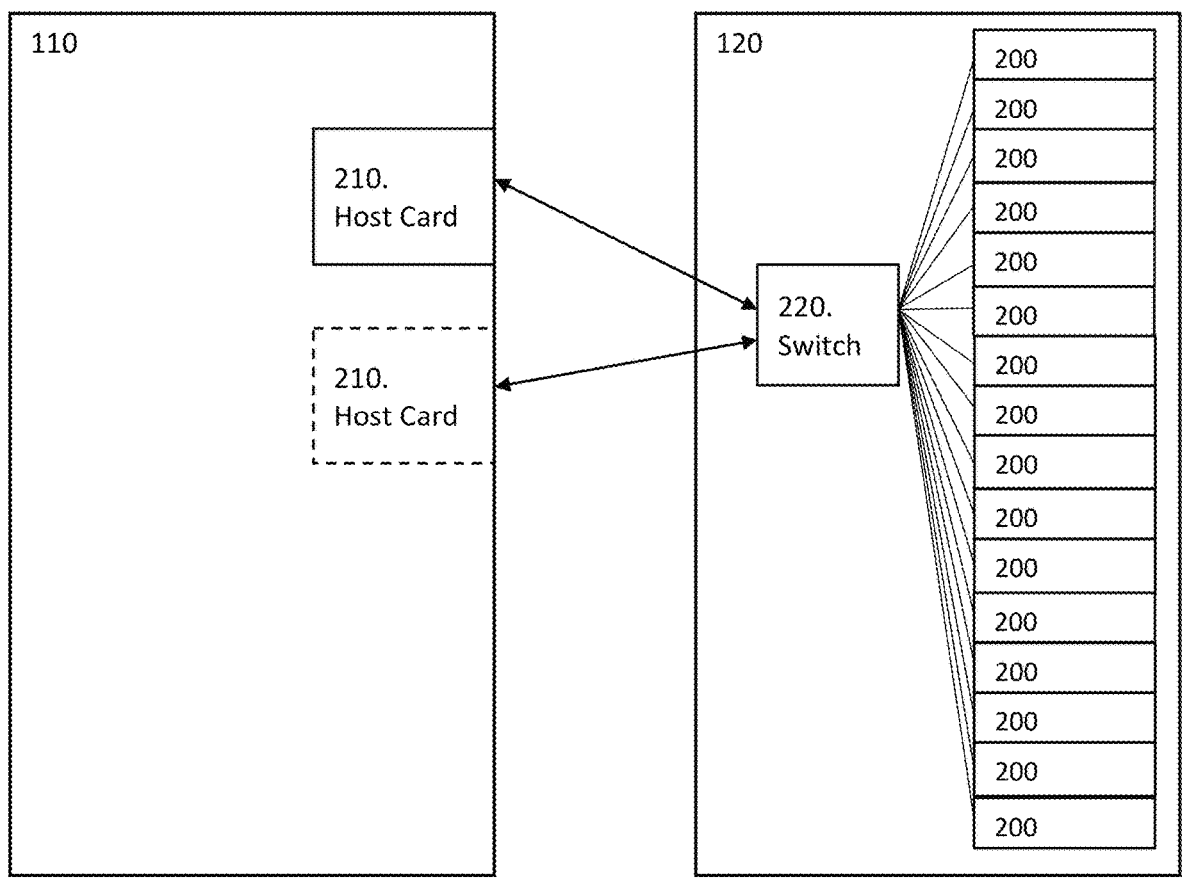
FIG. 2 illustrates the communication connection between the test controlling device and the connected rackmount chassis.

Referring to FIG. 1, a test system 100 may test a large number of devices across a connected PCIe bus. Referring also to FIG. 2, the system may include a server 110, such as the SANBlaze VLF, operating testing software to control various conditions and tests connected to a chassis 120, such as the SANBlaze SBExpress RM-4, holding the devices under test 200. Host cards 210 communicate with a PCIe switch 220 connecting the PCIe bus to each device. The version and number of host cards impacts the PCIe bandwidth. For example, using one Gen4 PCIe host card enables operation at a bandwidth of 32 GB/sec, while using two host cards doubles the bandwidth to 64 GB/sec. Gen3 PCIe host cards operate at slower data with lower bandwidth, while Gen5 PCIe host cards and future developments may operate faster with higher bandwidth. The SBExpress RM-4 has 16 slots, with each slot supporting either dual or single port non-volatile memory express (NVMe) solid state drives (SSDs), but alternate hardware configurations, including integration of server 100 and chassis 120 into a single hardware unit, may enable more or fewer devices under test, and operate to test any type of PCIe device.

Figure 3:
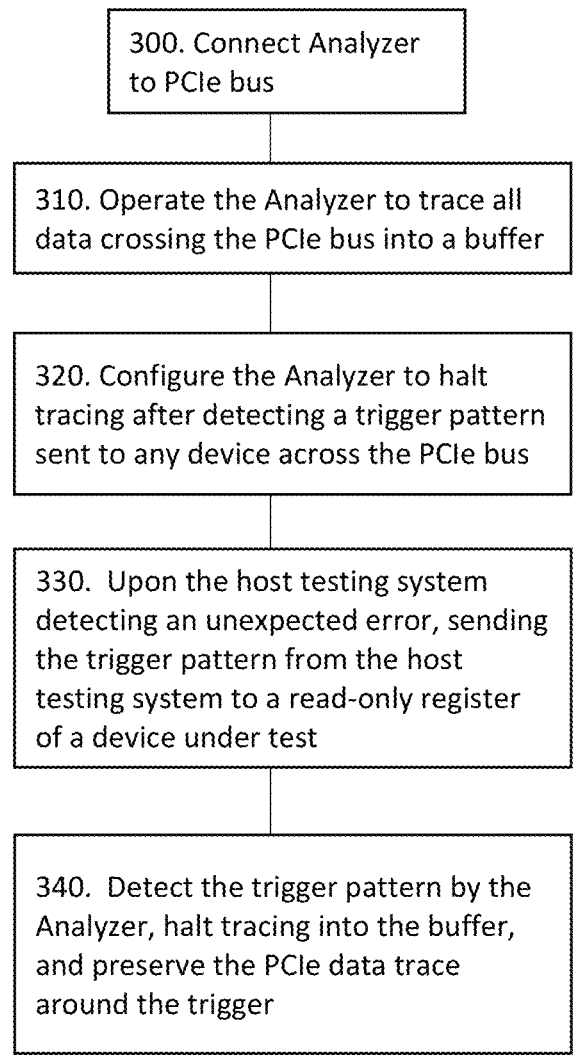
FIG. 3 illustrates a flowchart of the process for triggered data capture around an unexpected error.

During testing, unexpected errors on the PCIe bus may be encountered. Referring also to FIG. 3, to capture the specific data on the PCIe bus at the time of an error, a PCIe analyzer may be connected 300 to the bus between the system controlling the test and the device under test. As an example analyzer, a Kodiak PCIe Analysis System may be connected by plugging an interposer of the analysis system into the PCIe bus alongside the devices under test. PCIe analyzers trace 310 all data crossing the PCIe bus into a buffer. The analyzer can be configured 320 to stop tracing upon detection of specific data on the PCIe bus (or a configurable amount of data thereafter), thereby preserving PCIe bus data for review. If specific data crossing the PCIe bus event is known to cause a problem, the analyzer can be configured to trigger and capture and preserve a trace of the PCIe bus data around that specific data. In order to capture a trace around events having an unknown cause, and absent a physical integration between the analyzer system and the test system, another method is needed for the test system to trigger a trace capture by the analyzer.

A solution is to a send a pattern over the PCIe bus from the test system which the analyzer is configured to recognize and based on that recognition capture the trace of the PCIe bus data. The challenge in sending such pattern is it needs to be addressed to a device connected on the PCIe bus, and should not interfere with or otherwise alter the devices under test.

One pattern which can be sent and detected without impacting devices under test is a write 330 into a controller's device or vendor registers, which are read-only so the write will be ignored by the actual device. Any detectable trigger pattern can be used, such as "1ae3". With a test system configured to send such trigger pattern, the analyzer can be configured to capture a PCIe data trace based on detection of the trigger pattern.

Figure 4:
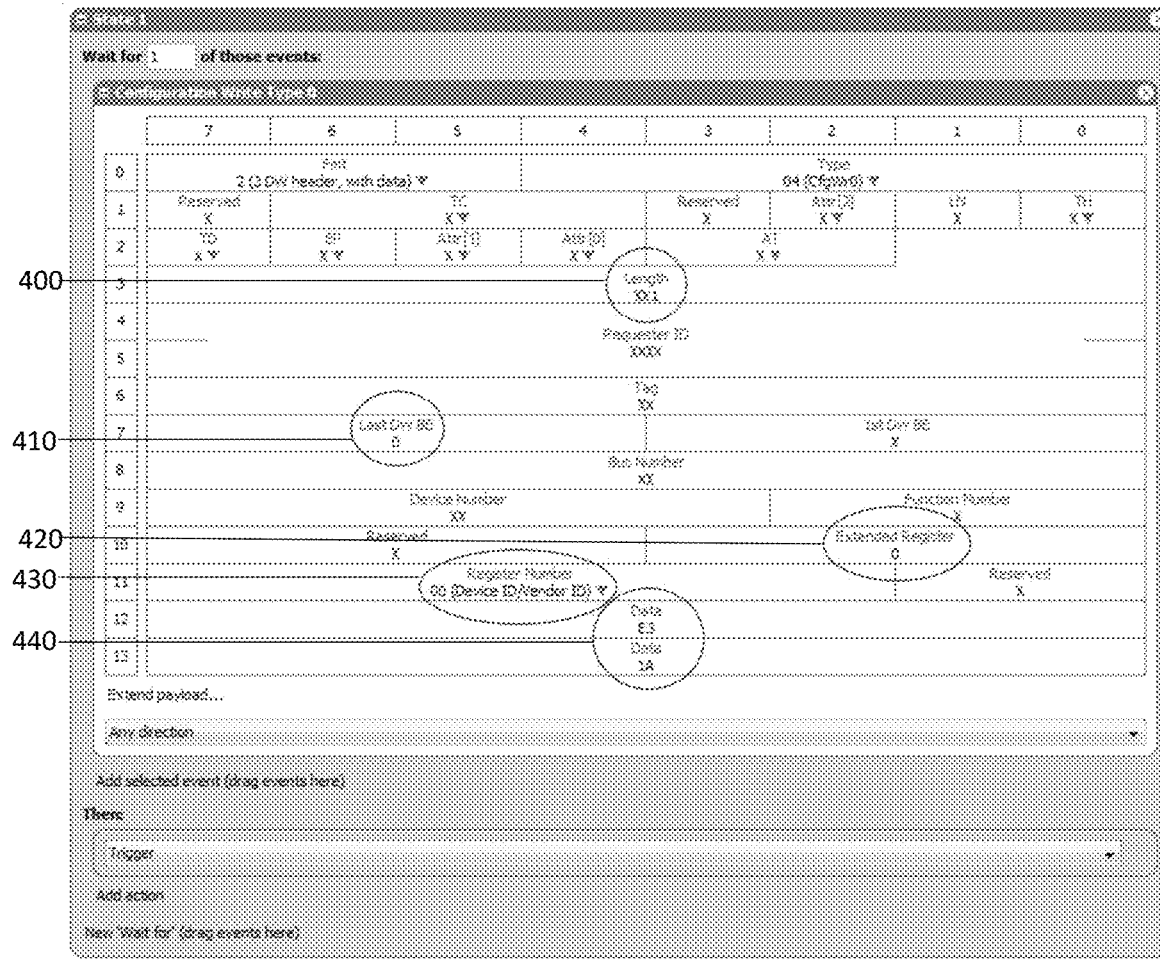
FIG. 4 is a software interface for trigger configuration within the PCIe analyzer.

Referring also to FIG. 4, within the analyzer configuration a trigger may be added for Configuration Write Type 0. The Transfer Length 400 should be set to 1, the Last DW BE 410 set to 0, the Extended Register 420 set to 0, the Register Number 430 set to 00 (Device ID/Vendor ID). The payload should be extended two bytes, allowing data bytes 12 and 13 to be set to the detectable pattern, such as Data Bytes 12 and 13 430 set to E3 and 1A. Alternatively, the payload may be extended four or more bytes, allowing additional information about the error (such as specific types and subtypes) to be included in the pattern sent by the test system.

The test system may be configured, by default, to send the detectable pattern and trigger a PCIe trace on specific errors. Additional data codes may identify the error, and be included in the pattern (and if so, the analyzer trigger payload should be equivalently extended). One example set of error triggers may include:

0100—error requiring Controller Reset
0200—command timeout
0300—Controller Fatal Status detected
0400—error during Controller Reset or Initialization
0500—error during NVM Subsystem Reset
0600—error during PCI Reset
0700—error waiting for Controller Ready (being enabled)
0800—error waiting for Controller Shutdown (being disabled)
0900—device is "Gone"

These may be individually enabled or disabled through command line or user interface controls of the test system.

Additionally, a command line interface on the test system may be used to manually send a trigger signal, or scripts may be stored and run on the test system to send a trigger signal on additional error conditions. Within an example test system, an "sb_echo trigger=X[,Y]>/proc/vlun/nvme" command may be used, where X identifies a specific controller by target number or PCI name and the optional Y identifies the additional error information.

After the trigger pattern is sent from the test system to the PCIe analyzer, a trace of the PCIe data is retained 340 on the analyzer. The specific trigger and any additional error information may be viewed, along with PCIe data before and after the error. This preserves the specific trace around an otherwise untraceable error.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method for capturing a bus data trace around an error event during testing of a peripheral component interconnect express (PCIe) device, comprising:
   connecting a test system to one or more devices under test across a PCIe bus, wherein the one or more devices under test comprise up to sixteen non-volatile memory express solid state drives;
   connecting a PCIe analyzer to the PCIe bus;
   capturing, by the PCIe analyzer, a trace of PCIe data into a buffer;
   transmitting data from the test system across the PCIe bus to the devices under test to test the devices under test;
   upon detecting, by the test system, an unexpected error, sending a trigger pattern across the PCIe bus within a write to a read-only register such that the trigger pattern is recognizable by the PCIe analyzer without impacting any of the devices under test; and
   detecting, by the PCIe analyzer, the trigger pattern and halting PCIe trace data capture to preserve PCIe data around the unexpected error.

2. A method for capturing a bus data trace around an error event during testing of a peripheral component interconnect express (PCIe) device, comprising:
   connecting a test system to one or more devices under test across a PCIe bus;
   connecting a PCIe analyzer to the PCIe bus;
   capturing, by the PCIe analyzer, a trace of PCIe data into a buffer;
   transmitting data from the test system across the PCIe bus to the devices under test to test the devices under test;
   upon detecting, by the test system, an unexpected error, sending a trigger pattern across the PCIe bus such that the trigger pattern is recognizable by the PCIe analyzer without impacting any of the devices under test; and
   detecting, by the PCIe analyzer, the trigger pattern and halting PCIe trace data capture to preserve PCIe data around the unexpected error.

3. The method of claim 2, further comprising simultaneously testing, as the one or more devices under test, up to sixteen non-volatile memory express solid state drives.

4. The method of claim 2, further comprising sending the trigger pattern within a write to a read-only register.

5. The method of claim 4, further comprising including four bytes of data within the write that includes the trigger pattern, wherein the four bytes of data specify a type and subtype associated with the unexpected error.

6. A system for capturing a bus data trace around an error event during testing of a peripheral component interconnect express (PCIe) device, comprising:
   a host test server;
   one or more devices under test connected to the host test server across a PCIe bus;
   a PCIe analyzer connected to the PCIe bus;
   wherein the PCIe analyzer includes a processor operating software instructions to:
      capture a trace of PCIe data into a buffer; and
      detect a trigger pattern sent on the PCIe bus and halting PCIe trace data capture; and
   wherein the host test server includes a processor operating software instructions to:
      transmit data across the PCIe bus to the devices under test to test the devices under test; and
      upon detecting an unexpected error, send the trigger pattern across the PCIe bus such that the trigger pattern is recognizable by the PCIe analyzer without impacting any of the devices under test.

7. The system of claim 6, wherein the one or more devices under test further comprise up to sixteen non-volatile memory express solid state drives.

8. The system of claim 6, wherein the host test server software instructions further comprise instructions to send the trigger pattern within a write to a read-only register.

9. The system of claim 8, wherein the host test server software instructions further comprise instructions to include four bytes of data within the write that includes the trigger pattern, wherein the four bytes of data specify a type and subtype associated with the unexpected error.

* * * * *